US007753971B2

(12) United States Patent
Sakurai et al.

(10) Patent No.: US 7,753,971 B2
(45) Date of Patent: Jul. 13, 2010

(54) FUEL REFORMING APPARATUS

(75) Inventors: Kazuhiro Sakurai, Gotemba (JP); Kazuhiro Wakao, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 866 days.

(21) Appl. No.: 11/547,251

(22) PCT Filed: Feb. 15, 2006

(86) PCT No.: PCT/JP2006/303097

§ 371 (c)(1), (2), (4) Date: Oct. 3, 2006

(87) PCT Pub. No.: WO2006/100863

PCT Pub. Date: Sep. 28, 2006

(65) Prior Publication Data

US 2007/0258871 A1 Nov. 8, 2007

(30) Foreign Application Priority Data

Mar. 22, 2005 (JP) ............................ 2005-082425

(51) Int. Cl.
*B01J 7/00* (2006.01)

(52) U.S. Cl. ............................ 48/61; 48/127.9; 48/95; 48/215; 48/117; 422/211; 422/222; 422/187; 422/188; 423/651; 502/300; 428/116

(58) Field of Classification Search ......... 422/187-188, 422/222; 428/116; 502/439; 48/127.9
See application file for complete search history.

(56) References Cited

U.S. PATENT DOCUMENTS

| | | | | |
|---|---|---|---|---|
| 3,871,838 | A | 3/1975 | Henkel et al. | |
| 5,533,167 | A | 7/1996 | Kondo et al. | |
| 2003/0224933 | A1* | 12/2003 | Kondo et al. | 502/439 |
| 2004/0144337 | A1 | 7/2004 | Wakao et al. | |
| 2004/0254073 | A1* | 12/2004 | Wei et al. | 502/527.12 |

FOREIGN PATENT DOCUMENTS

| | | |
|---|---|---|
| EP | 0 304 707 A1 | 3/1989 |
| JP | B2 5-65708 | 9/1993 |
| JP | A 6-219701 | 8/1994 |
| JP | A 8-91802 | 4/1996 |
| JP | A-08-283002 | 10/1996 |
| JP | A-2000-007301 | 1/2000 |
| JP | A 2000-7303 | 1/2000 |
| JP | A-2000-247603 | 9/2000 |
| JP | A-2001-146401 | 5/2001 |
| JP | A 2001-227419 | 8/2001 |
| JP | A 2001-248506 | 9/2001 |
| JP | A 2004-251273 | 9/2004 |

* cited by examiner

*Primary Examiner*—Alexa D. Neckel
*Assistant Examiner*—Kaity V. Handal
(74) *Attorney, Agent, or Firm*—Oliff & Berridge, PLC

(57) ABSTRACT

Two types of cells (first cells and second cells) are used to constitute a honeycomb structure. The first cells and second cells differ in the catalyst supporting position. The first cells and second cells are alternately arranged. The catalyst supporting position of the second cells is shifted in the direction of the downstream side of the flow of an air-fuel mixture from the catalyst supporting position of the first cells so that when an exothermic reaction occurs on the second cell side of a partition wall for separating a first cell from a second cell, an endothermic reaction occurs on the opposing first cell side of the partition wall.

1 Claim, 3 Drawing Sheets

FUEL REFORMING APPARATUS

TECHNICAL FIELD

The present invention relates to a fuel reforming apparatus for generating reformed gas containing hydrogen by reforming hydrocarbon fuel with a catalyst.

BACKGROUND ART

A known conventional technology disclosed, for instance, by Japanese Patent Laid-Open No. 2004-251273 supplies a mixture of hydrocarbon fuel and air to a catalyst, obtains reformed gas through a reforming reaction with the catalyst, and supplies the obtained reformed gas to an internal combustion engine. A fuel reforming apparatus described in Japanese Patent Laid-Open No. 2004-251273 uses a partial oxidation reaction as a reforming reaction. When hydrocarbon fuel is subjected to partial oxidation, a reformed gas containing $H_2$ and CO is generated as indicated in the following chemical formula:

$$C_mH_n+(m/2)O_2 \rightarrow mCO+(n/2)H_2 \quad (1)$$

Another known fuel reforming apparatus adds steam to a mixture of hydrocarbon fuel and air, supplies the resulting mixture to a catalyst, and obtains reformed gas. In this instance, the hydrocarbon fuel is subjected to a steam reforming reaction with the catalyst as indicated in the following chemical formula in addition to the aforementioned partial oxidation reaction:

$$C_mH_n+mH_2O \rightarrow mCO+(m+n/2)H_2 \quad (2)$$

$H_2$ and CO, which are generated as a result of the above partial oxidation reaction and steam reforming reaction, excel in combustibility. Therefore, when, for instance, a reformed gas containing $H_2$ and Co is supplied to an internal combustion engine at the time of a cold start, the startability of the internal combustion engine can be improved. In addition, the exhaust emission quality can also be improved.

Including the above-mentioned document, the applicant is aware of the following documents as a related art of the present invention.

[Patent Document 1]
Japanese Patent Laid-Open No. 2004-251273
[Patent Document 2]
Japanese Patent Publication No. Hei5-65708
[Patent Document 3]
Japanese Patent Laid-Open No. 2001-227419
[Patent Document 4]
Japanese Patent Laid-Open No. 2000-7303
[Patent Document 5]
Japanese Patent Laid-Open No. Hei8-91802
[Patent Document 6]
Japanese Patent Laid-Open No. Hei6-219701

The reaction speed of the aforementioned partial oxidation reaction is high. When the air-fuel mixture flows to the catalyst, the reaction virtually terminates in an upstream area of the catalyst. FIG. 4 is a graph illustrating the relationship between the catalyst bed temperature and the position within the catalyst in the direction of a gas flow. As indicated in the graph, the catalyst bed temperature is extremely high in an upstream area of the catalyst in which a partial oxidation reaction (PO reaction) has progressed. The reason is that the partial oxidation reaction is an exothermic reaction. The catalyst is heated by reaction-induced heat. On the other hand, in a downstream area of the catalyst in which the partial oxidation reaction is virtually terminated, the catalyst bed temperature gradually lowers due to heat dissipation from the catalyst. Further, $CO_2$ and $H_2O$ are generated in a lean region as well as $H_2$ and CO due to fuel atomization failure or mixing failure, which occurs during the use of an air-fuel mixture. In a rich region, on the other hand, unreformed HC is generated. The generated $CO_2$, $H_2O$, and unreformed HC react in a downstream area of the catalyst as indicated in the following reaction formula:

$$aC_mH_{n+b}CO_2+cH_2O \rightarrow dCO+eH_2 \quad (3)$$

Since the above reaction is an endothermic reaction, the catalyst bed temperature in a downstream area of the catalyst further decreases.

The steam reforming reaction (SR reaction) is faster in reaction speed than the partial oxidation reaction. Therefore, when a mixture containing hydrocarbon fuel, air, and steam flows to the catalyst, mainly the partial oxidation reaction occurs in an upstream area of the catalyst, and mainly the steam reforming reaction occurs in a downstream area of the catalyst. FIG. 5 is a graph illustrating the relationship between the catalyst bed temperature and the position within the catalyst in the direction of a gas flow. As indicated in the graph, the catalyst bed temperature is extremely high in an upstream area of the catalyst in which a partial oxidation reaction, that is, an exothermic reaction, has progressed. On the other hand, in a downstream area of the catalyst in which the steam reforming reaction has progressed, the catalyst bed temperature significantly lowers. The reason is that heat is released from the catalyst due to the progress of the steam reforming reaction, which is an endothermic reaction, in addition to heat dissipation from the catalyst.

As described above, an upstream area of the catalyst in the conventional fuel reforming apparatus is readily overheated by the heat generated by a partial oxidation reaction, and the catalyst bed temperature in a downstream area of the catalyst readily lowers due to heat dissipation and endothermic reaction such as steam reforming reaction.

However, when the catalyst is excessively overheated, the precious metal in the catalyst may deteriorate due to sintering. Further, if the honeycomb structure that supports the catalyst is made of metal, it may corrode due to high-temperature oxidation. Even when a ceramic honeycomb structure is used; its strength may decrease. An outer casing may also corrode due to high-temperature oxidation because they are made of metal.

Meanwhile, when the catalyst bed temperature lowers in a downstream area of the catalyst, the concentrations of $H_2$ and CO in the reformed gas decrease to increase the concentration of THC. This is caused by the following methane generation reaction that progresses when the catalyst bed temperature lowers:

$$2H_2+2CO \rightarrow CO_2+CH_4 \quad (4)$$

When the above reaction progresses, the concentrations of $H_2$ and CO in the reformed gas decrease to increase the concentration of $CH_4$. A graph in FIG. 6 shows the relationship between the catalyst bed temperature and the THC concentration in the reformed gas. As indicated in the graph, there is an appropriate catalyst bed temperature that minimizes the THC concentration. The THC concentration increases as the catalyst temperature decreases from the appropriate temperature.

DISCLOSURE OF INVENTION

The present invention has been made to solve the above problem. It is an object of the present invention to provide a fuel reforming apparatus that prevents the catalyst from being overheated by an exothermic reaction and avoids a catalyst temperature drop due to heat dissipation and endothermic reaction.

The above object is achieved by a fuel reforming apparatus according to one aspect of the present invention. The fuel reforming apparatus generates reformed gas by supplying a mixture containing at least hydrocarbon fuel and air to a honeycomb structure supporting a catalyst and allows the air-fuel mixture to react with the catalyst. The honeycomb structure includes first cells and second cells, which differ in the catalyst supporting position and are arranged alternately. The catalyst supporting position of the second cells is shifted in the direction of the downstream side of the flow of the air-fuel mixture from the catalyst supporting position of the first cells.

In the aspect of the present invention, when a mixture containing at least hydrocarbon fuel and air is supplied to a catalyst, a partial oxidation reaction, which is an exothermic reaction, occurs on the upstream side of the catalyst. Subsequently, a $CO/H_2$ generation reaction, which is an endothermic reaction, occurs on the downstream side of the catalyst using unreformed hydrocarbon fuel, $CO_2$, and $H_2O$ as reaction substances. If steam is contained in the air-fuel mixture, a steam reforming reaction, which is an endothermic reaction, occurs on the downstream side of the catalyst subsequently to the partial oxidation reaction. According to the aspect of the present invention, the catalyst supporting position of the second cells is shifted in the direction of the flow of the air-fuel mixture from the catalyst supporting position of the first cells, which are adjacent to the second cells. Therefore, if an exothermic reaction occurs on the second cell side of a partition wall for separating a first cell from a second cell, heat dissipation and endothermic reaction occur on the opposing first cell side of the partition wall. The heat generated by the exothermic reaction in the second cell can then be consumed by heat dissipation and endothermic reaction in the second cell. This makes it possible to prevent the catalyst from being overheated by the exothermic reaction and avoid a catalyst temperature drop due to heat dissipation and endothermic reaction.

BEST MODE FOR CARRYING OUT THE INVENTION

An embodiment of the present invention will now be described with reference to FIGS. 1 to 3.

Figure 1:
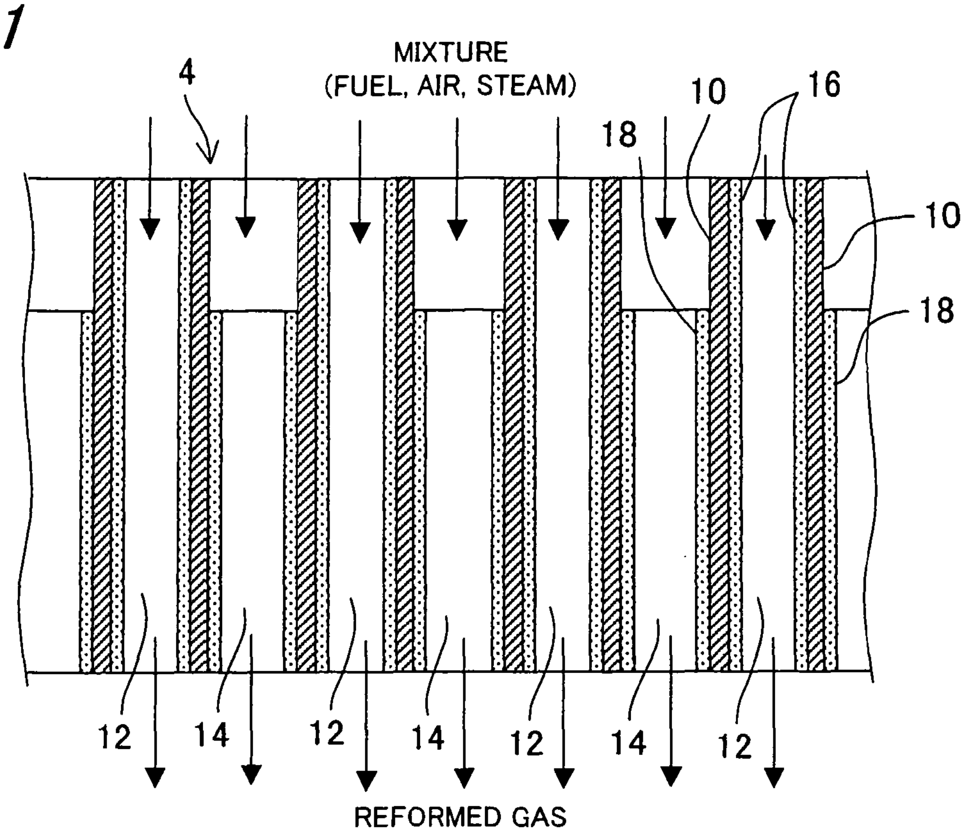
FIG. 1 is a cross-sectional view illustrating a characterizing portion of a fuel reforming apparatus according to an embodiment of the present invention.

FIG. 1 is a cross-sectional view illustrating a characterizing portion of a fuel reforming apparatus according to the present embodiment. FIG. 2 is a cross-sectional view illustrating the interior of the fuel reforming apparatus according to the present embodiment. FIG. 1 presents an enlarged view of section A in FIG. 2. FIG. 3 is a plan view illustrating a characterizing portion of the fuel reforming apparatus according to the present embodiment.

Figure 3:
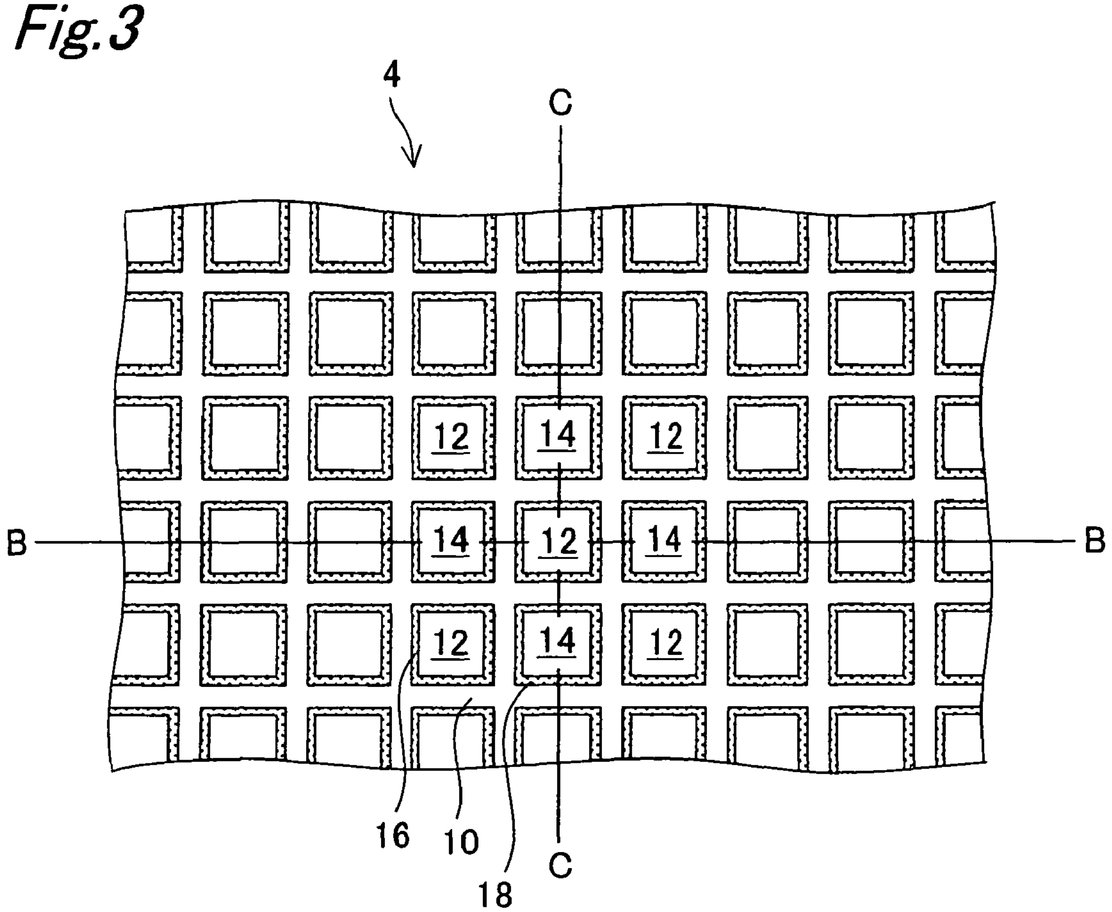
FIG. 3 is a plan view illustrating a characterizing portion of the fuel reforming apparatus according to an embodiment of the present invention.
Figure 4:
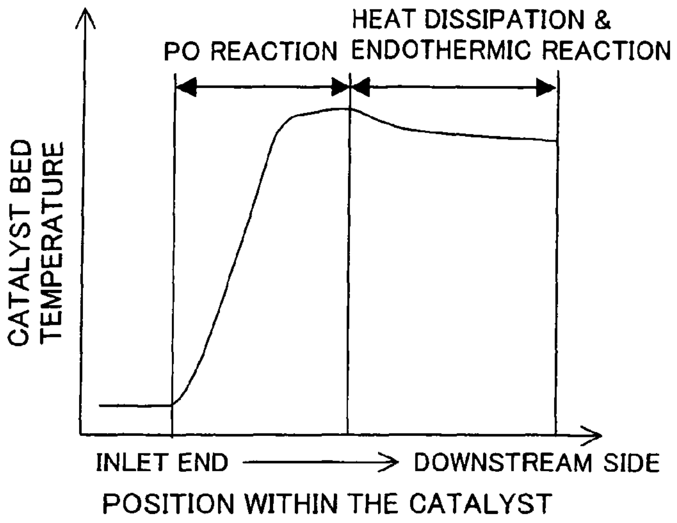
FIG. 4 is a graph illustrating the relationship between the catalyst bed temperature and the position within the catalyst in the direction of a gas flow in case a mixture containing hydrocarbon fuel and air flows to the catalyst.
Figure 5:
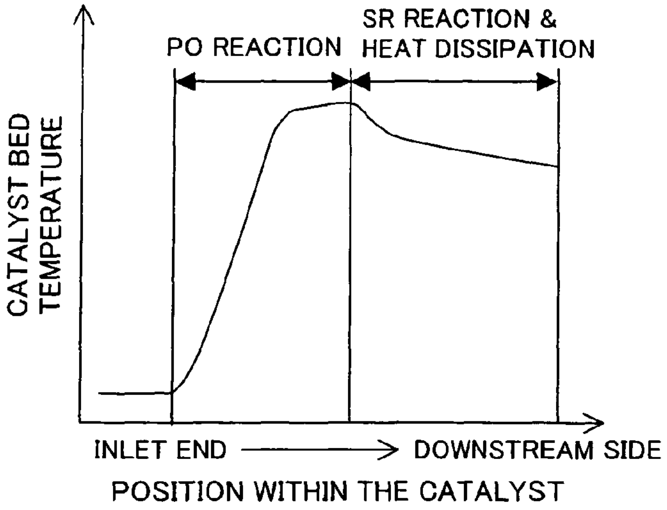
FIG. 5 is a graph illustrating the relationship between the catalyst bed temperature and the position within the catalyst in the direction of a gas flow in case a mixture containing hydrocarbon fuel, air, and steam flows to the catalyst.
Figure 6:
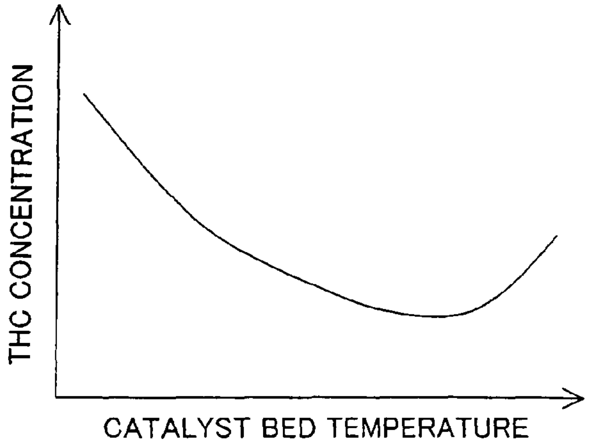
FIG. 6 is a graph illustrating the relationship between the catalyst bed temperature and the THC concentration in the reformed gas.

FIG. 1 is a cross-sectional view taken along line B-B or line C-C of FIG. 3. The fuel reforming apparatus according to the present embodiment can be used, for instance, as a fuel reforming apparatus for an internal combustion engine.

Figure 2:
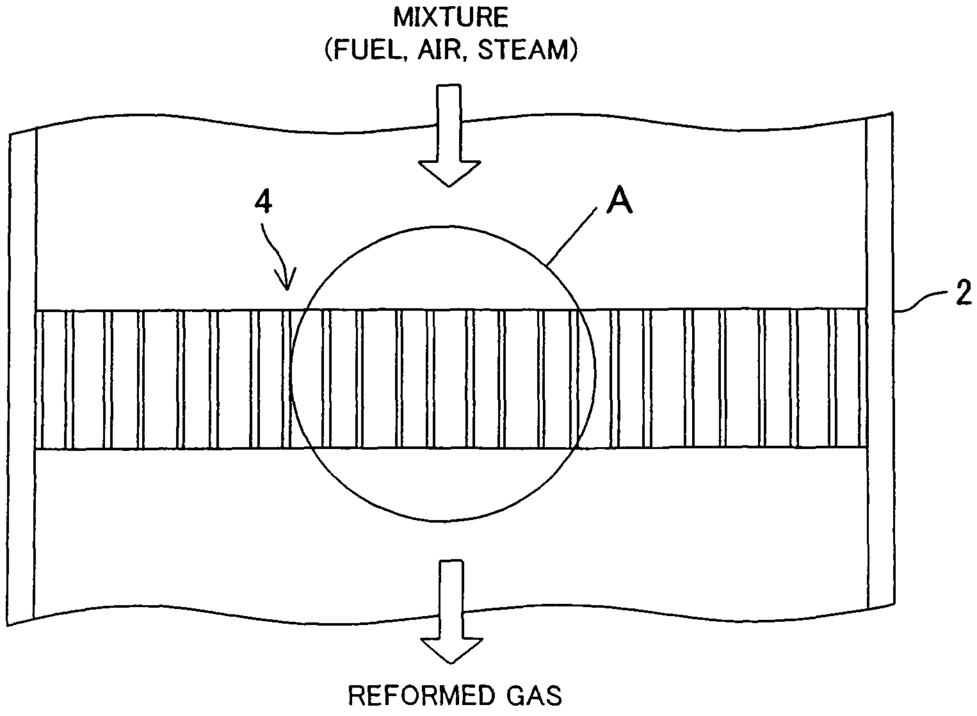
FIG. 2 is a cross-sectional view illustrating the interior of the fuel reforming apparatus according to an embodiment of the present invention.

As shown in FIG. 2, a catalyst reaction section 4 is provided within an outer casing 2 for the fuel reforming apparatus. The catalyst reaction section 4 is positioned so as to block the path of a gas flow in the outer casing 2. An air-fuel mixture, which flows into the outer casing 2, is reformed when it passes the catalyst reaction section 4. The air-fuel mixture supplied to the outer casing 2 comprises hydrocarbon fuel (e.g., gasoline), air, and steam. In the catalyst reaction section 4, the hydrocarbon fuel is subjected to a partial oxidation reaction and steam reforming reaction. A reformed gas containing $H_2$ and CO, which are derived from the reactions, is supplied to an intake system of an internal combustion engine and used as an internal combustion engine fuel.

The catalyst reaction section 4 of the fuel reforming apparatus according to the present embodiment has a peculiar structure. As shown in FIGS. 1 and 3, the catalyst reaction section 4 has a honeycomb structure, which comprises a plurality of cells 12, 14. A partition wall 10 is provided to separate one cell 12, 14 from another. Each cell 12, 14 has a square cross section and is adjacent to four other cells.

The cells constituting the catalyst reaction section 4 can be classified into two types of cells: first cells 12 and second cells 14. These two types of cells differ from each other in the catalyst supporting method. Catalyst coat layer 16 is applied between the inlet end and outlet end of the partition wall 10 of the first cells 12. On the other hand, the partition wall 10 of the second cells 14 is provided with catalyst coat layer 18 between the outlet end and a position that is a predetermined distance inward from the inlet end. In other words, the catalyst supporting position of the second cells 14 is shifted in the direction of the downstream side of the flow of the air-fuel mixture from the catalyst supporting position of the first cells 12. The first cells 12 and second cells 14 are alternately arranged in both the lengthwise direction (direction B-B in FIG. 3) and crosswise direction (direction C-C in FIG. 3) so that they are adjacent to the others.

The air-fuel mixture supplied to the catalyst reaction section 4 flows within the cells 12, 14. The air-fuel mixture reacts when it comes into contact with the catalyst coat layers 16, 18 on the cells 12, 14. In the first cells 12, the incoming air-fuel mixture comes into contact with catalyst coat layer 16 and reacts on catalyst coat layer 16. In such an instance, a partial oxidation reaction, which has a relatively high reaction speed, mainly occurs in the upstream area of catalyst coat layer 16. In the downstream area of catalyst coat layer 16, on the other hand, a steam reforming reaction and a $CO/H_2$ generation reaction indicated by reaction formula (3), which have a relatively low reaction speed, mainly occur. In the second cells 14, the incoming air-fuel mixture comes into contact with catalyst coat layer 18 and reacts on catalyst coat layer 18. In such an instance, a partial oxidation reaction, which has a relatively high reaction speed, mainly occurs in the upstream area of catalyst coat layer 18. In the downstream area of catalyst coat layer 18, on the other hand, a steam reforming reaction and a $CO/H_2$ generation reaction, which have a relatively low reaction speed, mainly occur.

In both the first cells 12 and second cells 14, a partial oxidation reaction mainly occurs in the upstream area of an air-fuel mixture flow, and a steam reforming reaction and a $CO/H_2$ generation reaction mainly occur in the downstream area. However, the first cells 12 and second cells 14 differ in the catalyst supporting position. Therefore, the first cells 12 and second cells 14, which are adjacent to each other, differ in the reaction position. More specifically, the upstream area of catalyst coat layer 16 on the first cells 12 corresponds to an area of the adjacent second cells 14 that has no catalyst. Therefore, an area of the first cells 12 where a partial oxidation reaction occurs is adjacent to an area of the second cells 14 where no reaction occurs. As a result, the reaction heat that is generated by a partial oxidation reaction in the first cells 12 can be dissipated from the wall surface of the second cells 14. If, in such an instance, the air-fuel mixture flowing into the second cells 14 contains liquid hydrocarbon fuel, heat dissipation from the second cells 14 is promoted by vaporization latent heat that is generated when the liquid hydrocarbon fuel vaporizes.

The upstream area of catalyst coat layer 18 on the second cells 14 corresponds to the downstream area of catalyst coat layer 16 on the adjacent first cells 12. Therefore, an area of the first cells 12 where a steam reforming reaction and a $CO/H_2$ generation reaction occur is adjacent to an area of the second cells 14 where a partial oxidation reaction occurs with the partition wall 10 positioned between the first and second cells. The partial oxidation reaction is an exothermic reaction, whereas the steam reforming reaction and the $CO/H_2$ generation reaction are endothermic reactions. Therefore, the reaction heat generated by the partial oxidation reaction in the second cells 14 can be absorbed by the steam reforming reaction and the $CO/H_2$ generation reaction in the adjacent first cells 12.

The downstream area of catalyst coat layer 18 on the second cells 14 corresponds to the end area of catalyst coat layer 16 on the adjacent first cells 12. In the end area, the steam reforming reaction and the $CO/H_2$ generation reaction are virtually terminated. Further, the gas temperature in the end area is raised by the reaction heat that is generated in the upstream area. Therefore, the heat required for catalyst bed temperature maintenance can be supplied from the adjacent first cells 12 to the downstream area of catalyst coat layer 18.

As described above, in the fuel reforming apparatus according to the present embodiment, the reaction heat generated by the partial oxidation reaction in the upstream area of catalyst coat layer 18 can be consumed by the steam reforming reaction and the $CO/H_2$ generation reaction in the downstream area of the adjacent catalyst coat layer 16. This makes it possible to prevent the upstream area of catalyst coat layer 18 from being overheated by the reaction heat, avoid a temperature drop in the downstream area of catalyst coat layer 16, accelerate the steam reforming reaction and the $CO/H_2$ generation reaction, and inhibit a methane generation reaction.

The reaction heat generated by the partial oxidation reaction in the upstream area of catalyst coat layer 16 can be dissipated from the wall surface of the adjacent second cells 14. It is therefore possible to prevent the upstream area of catalyst coat layer 16 from being overheated by the reaction heat. Further, since the heat of a reformed gas flow in the adjacent first cells 12 can be supplied to the downstream area of catalyst coat layer 18 via the partition wall 10, it is possible to avoid a temperature drop in the downstream area of catalyst coat layer 18.

While the present invention has been described in terms of a preferred embodiment, it should be understood that the invention is not limited to the preferred embodiment, and that variations may be made without departure from the scope and spirit of the invention. For example, the following modifications may be made to the preferred embodiment of the present invention.

In the embodiment described above, a mixture of hydrocarbon fuel, air, and steam is supplied. However, a mixture of hydrocarbon fuel and air may alternatively be supplied. When a mixture of hydrocarbon fuel and air is supplied, a partial oxidation reaction mainly occurs within the upstream area of an air-fuel mixture flow in both the first cells 12 and second cells 14. In the downstream area, on the other hand, heat dissipation and the endothermic $CO/H_2$ generation reaction mainly occur. However, the first cells 12 and second cells 14 differ in the catalyst supporting position. Therefore, an area of the first cells 12 in which heat dissipation and endothermic reaction occur is adjacent to an area of the second cells 14 in which a partial oxidation reaction occurs with the partition wall 10 positioned between the first and second cells. The reaction heat generated by the partial oxidation reaction in the second cells 14 can then be absorbed by means of heat dissipation and endothermic reaction in the adjacent first cells 12. As a result, it is possible to prevent the catalyst from being overheated by an exothermic reaction and avoid a temperature drop in the catalyst due to heat dissipation and endothermic reaction.

In the embodiment described above, the first cells 12 have catalyst coat layer 16, which begins with the inlet end of the partition wall 10. However, catalyst coat layer 16 may alternatively begin with a position that is a predetermined distance inward from the inlet end of the partition wall 10. This alternative is acceptable as far as the leading end of catalyst coat layer 16 is shifted in the direction of the upstream side of the flow of the air-fuel mixture from the leading end of catalyst coat layer 18, which is provided for the second cells 14. The difference between the leading end positions of catalyst coat layers 16 and 18 may be set in consideration of the rate of a gas flow and the speed of each reaction. In the embodiment described above, the trailing end positions of catalyst coat layers 16 and 18 are both at the outlet ends of the cells 12, 14. In reality, however, the trailing end positions of catalyst coat layers 16 and 18 are not strictly defined.

In the embodiment described above, the fuel reforming apparatus according to the present invention is used as a source for supplying reformed gas to an internal combustion engine. However, the fuel reforming apparatus according to the present invention is not limited to such a use.

The invention claimed is:

1. A fuel reforming apparatus comprising: a honeycomb structure supporting a catalyst, the fuel reforming apparatus for generating reformed gas by supplying a mixture containing at least hydrocarbon fuel and air to the honeycomb structure supporting the catalyst and by allowing the air-fuel mixture to react with the catalyst, wherein the honeycomb structure includes first cells and second cells, which have gas passages that are open at both ends, the first cells and the second cells differ in the catalyst supporting position on the passages and are arranged alternately; and wherein the catalyst supporting position of the second cells is shifted in a direction of a downstream side of a flow of the air-fuel mixture from the catalyst supporting position of the first cells.

* * * * *